United States Patent [19]

Geyer

[11] Patent Number: 4,981,364
[45] Date of Patent: Jan. 1, 1991

[54] EXTRUSION APPARATUS

[76] Inventor: Paul Geyer, 15660 Tacoma, Detroit, Mich. 48025

[21] Appl. No.: 194,069

[22] Filed: May 12, 1988

[51] Int. Cl.⁵ .............................................. B01F 7/08
[52] U.S. Cl. ..................................... 366/81; 366/88; 366/90; 366/319; 366/324
[58] Field of Search ................. 366/81, 88, 89, 90, 366/244, 302, 318, 319, 322, 323, 324

[56] References Cited

U.S. PATENT DOCUMENTS

| | | |
|---|---|---|
| Re. 26,147 | 1/1967 | Parshall et al. |
| 1,333,249 | 3/1920 | Fiddyment |
| 2,200,997 | 5/1940 | Royle |
| 2,343,529 | 3/1944 | Brown |
| 2,433,936 | 1/1948 | Tornberg |
| 2,505,125 | 4/1950 | List ........................................ 366/80 |
| 2,537,395 | 1/1951 | Brown |
| 2,583,600 | 1/1952 | Schreiber |
| 2,595,455 | 5/1952 | Heston |
| 2,680,873 | 6/1954 | Schnuck et al. ...................... 366/90 |
| 2,765,490 | 10/1956 | Zona |
| 2,765,491 | 10/1956 | Magerkurth |
| 2,848,739 | 8/1958 | Henning |
| 2,871,516 | 2/1959 | Sherman |
| 3,102,694 | 9/1963 | Frenkel |
| 3,164,375 | 1/1965 | Frenkel |
| 3,271,819 | 9/1966 | Lacher |
| 3,358,327 | 12/1967 | Maillefer |
| 3,375,549 | 4/1968 | Geyer |
| 3,445,890 | 5/1969 | Heston et al. |
| 3,475,787 | 11/1969 | Heston |
| 3,475,788 | 11/1969 | Heston |
| 3,487,503 | 1/1970 | Barr et al. |
| 3,632,255 | 1/1972 | Geyer |
| 3,698,541 | 10/1972 | Barr |
| 3,745,200 | 7/1973 | Geyer |
| 3,868,093 | 2/1975 | Sokolow ........................... 366/88 X |
| 3,869,301 | 3/1975 | Geyer et al. |
| 3,869,304 | 3/1975 | Geyer et al. |
| 3,871,810 | 3/1975 | Geyer |
| 3,881,708 | 5/1975 | Carle .................................. 366/89 X |
| 3,888,469 | 6/1975 | Geyer |
| 3,956,056 | 5/1976 | Geyer et al. |
| 4,075,712 | 2/1978 | Geyer |
| 4,136,967 | 1/1979 | Meyer ................................. 366/88 |
| 4,178,104 | 12/1979 | Menges et al. |
| 4,199,263 | 4/1980 | Menges et al. |
| 4,462,692 | 7/1984 | Meyer ................................. 366/89 |
| 4,779,989 | 10/1988 | Barr .................................... 366/88 |

OTHER PUBLICATIONS

Magazine "Modern Plastics", Jan. 1963, entitled A Two-Channel Extruder Screw, by C. Maillefer of Maillefer S.A., Renens-Lausanne, Switzerland, 4 pages.

Primary Examiner—Frankie L. Stinson
Attorney, Agent, or Firm—Dykema Gossett

[57] ABSTRACT

The apparatus is for the extrusion of thermoplastic and rubber-like materials, more particularly an apparatus which has a feed means or hopper adapted for hot or cold feed of the selected materials. The apparatus has an extruder screw-type forcing zone followed by a straining refining zone, a straining means adjustable to the acceptable particle size and arranged to refine agglomerates to the acceptable particle size, and numerous circumferential grooves which inherently develop the fast forward flow of the fluent phase material and is arranged to place the developed fluent phase material at the entrances to the straining or refining openings. The apparatus has an adequate straining opening length to provide for full extrusion capacity; intensively shears and leads off all of the process material, crossing the tooth top once only thereby achieving uniformity of processing. The apparatus has a rotor tooth top groove which intercepts all of the process material flowing through the clearance tooth top to barrel bore, from the circumferential grooves, upstream and downstream of the tooth and has the circumferential tooth top groove communicating with a concentric bore of the rotor, through numerous ports which orient the lead off process material flow lines in a radial direction.

2 Claims, 4 Drawing Sheets

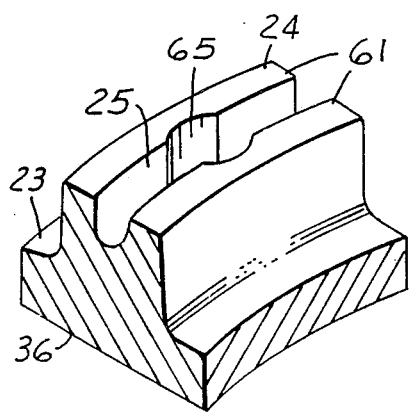
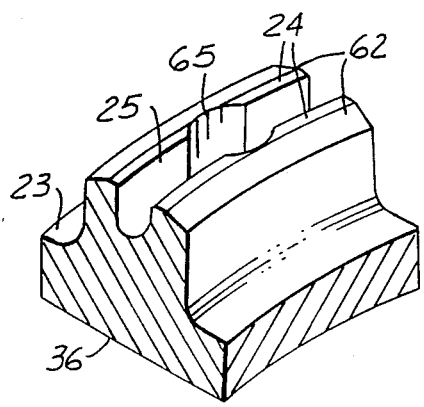
FIG.8  FIG.9
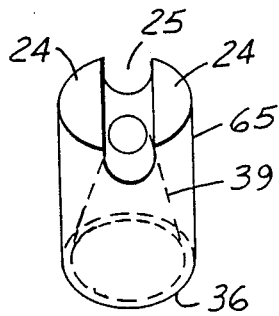
FIG.10
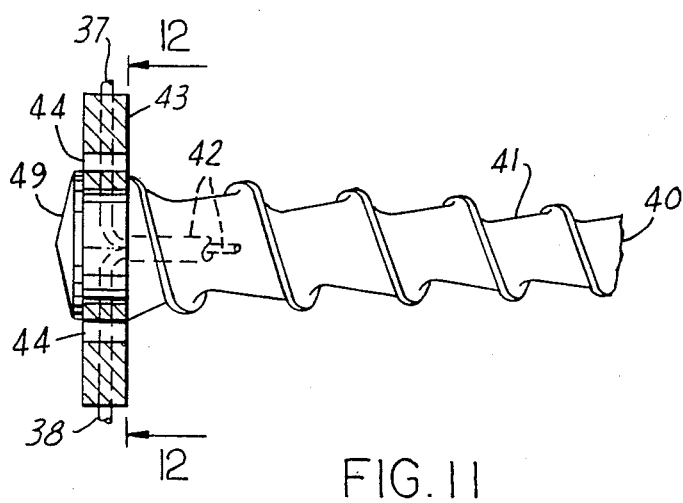
FIG.11
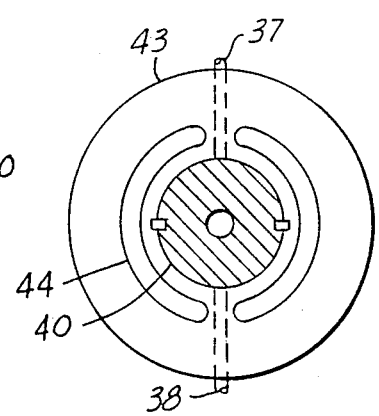
FIG.12

EXTRUSION APPARATUS

FIELD OF THE INVENTION

This invention relates to an extrusion apparatus, more particularly to an apparatus of the rotor and barrel type for refining, straining, mixing and extruding of thermoplastic and rubber-like materials.

BACKGROUND OF THE INVENTION

The rubber and plastic industries use screen-type straining devices to separate the oversize material from the extrusion, the restrictive holes of which progressively become plugged, causing an increase in the extrusion pressure required to process the material. The progressive change in pressure requires additional input work and therefore results in uneven processing. The plastic industry has advanced to the stage where continuous screen-changing devices are used to improve uniformity.

Extrusion mixing of rubber-like materials is limited by heat build-up in the process material, and therefore any improvement in mixing has to be accomplished without any increase in input power. Thus, the length of a rubber extruder operating with a full screw is limited to approximately seven diameters for process material as used in tire manufacturing.

SUMMARY OF THE INVENTION

It is therefore a feature of the present invention to provide an improved extrusion apparatus which intensively shears all of the process material with minimum rework of already mixed and warmed process material.

Another feature is to provide an improved apparatus which will separate the fine and fluent from the oversize and less fluent process material and direct the rejected material to a separate discharge port.

Still another feature is to provide a straining apparatus in which the size of the restrictive openings can be adjusted to suit the requirements of the process material.

A further feature is to provide an apparatus in which wear, rotor outside diameter and barrel inside diameter can be compensated for by relative movement of the barrel and rotor.

A still further feature is to provide an apparatus in which the entrance to the restrictive openings can be tapered to effect intensive shear and refining action on the process material as it is led off from the main stream.

Another feature is to provide an apparatus in which the circumferential extrusion grooves thereof generate fluent material at the rotor outside diameter and at the restrictive opening entrances.

Still another feature is to provide an apparatus which directs the flow of oversize material, rejected by the restrictive openings, downstream to subsequent circumferential extruder grooves and the regulated rate overflow device.

Still another feature is to provide an apparatus in which the restrictive openings are formed between moving surfaces and thereby do not become plugged with oversize material.

A further feature is to provide an apparatus which minimizes the rework of already mixed material.

A still further feature is to provide an apparatus with circumferential extruder grooves progressively decreased in depth to generate pressure to assist in forcing the process material into restrictive openings at each side of the circumferential extruder groove.

Another feature is to provide an apparatus, the circumferential design of which provides the fast-forward flow of the fluent phase material and thereby exposes the less fluent material to extruder action.

Still another feature is to provide an apparatus which blends the process material as it is transferred from the extruder screw to the internal stationary core screw.

Still another feature is to provide an apparatus which provides an extruder from which the extrusion is from a stationary screw, thus eliminating the "blips" as formed by a rotating rotor.

A further feature is to provide an apparatus which has a separate regulated rate overflow device for the discharge of oversize material without decreasing upstream extrusion pressure.

BRIEF DESCRIPTION OF THE DRAWINGS

FIG. 8 is an isometrical view of the tooth top of the teeth forming the circumferential grooves of the straining and refining zone adapted for straining.

FIG. 9 is an isometrical view of the tooth top of the teeth forming the circumferential grooves of the straining and refining zone adapted for refining.

FIG. 10 is an isometrical view of the port connecting the tooth top groove with the bore of the rotor.

FIG. 11 is an elevational view of the stationary screw-like member for installation into the bore of the rotor.

FIG. 12 is an end view taken on the line 12—12 of FIG. 11.

DESCRIPTION OF THE PREFERRED EMBODIMENT

Introduction

Figure 1:
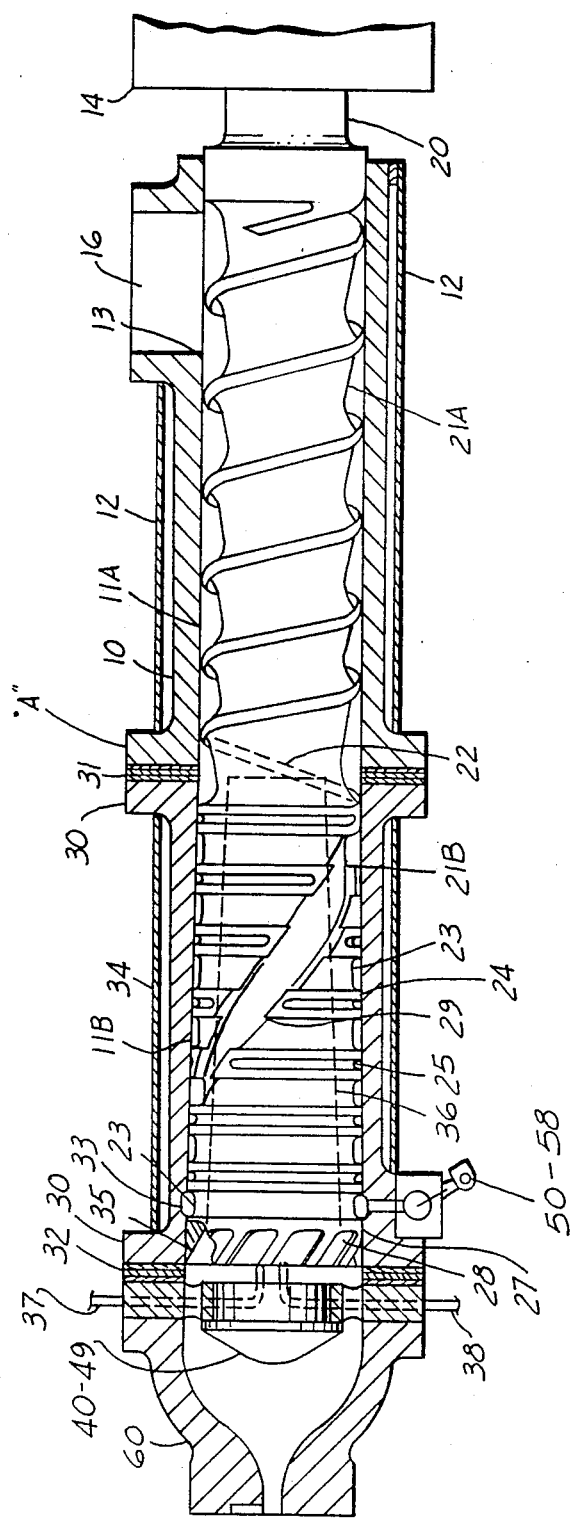
FIG. 1 is a longitudinal sectional view of an extrusion apparatus constructed in accordance with the present invention and which represents the preferred embodiment as applied to the straining and refining of hot or cold feed rubber-like materials and thermoplastic materials, while extruding the material into the desired product.

In the present invention, the feeding and pressurizing of the process material can be essentially that of modern day practice for the type of material being processed, hot or cold feed of rubber-like material or thermoplastics. The hopper may be constructed in accordance with my U.S. Pat. No. 3,888,469 to deaerate the feed material, when crumb or pelletized rubber is processed, or my U.S. Pat. No. 3,632,255, when exceptionally uniform extrusion is required.

The material from the pressurizing zone enters the straining and refining zone of the present invention, which is comprised of a rotor and a barrel member which are tapered in diameter, small at the lead end and large at the trailing end. An arrangement is provided which makes the clearance rotor outside diameter to barrel bore adjustable by endwise adjustment of the rotor to the barrel. As the straining opening is this clearance, the straining opening is also adjustable, and can be set to the size of the process material acceptable to specifications. The sharp edge entrance as used for straining is replaced by a beveled edge entrance for refining agglomerates, which become wedged against the barrel and are reduced to size if possible.

The rotor of the straining and refining zone is provided with a high-lead helical groove which starts at extruder capacity and progressively decreases in capacity to near zero at the end of the zone. The process material flow in this groove is typical of helical extrusion groove flow, and the warmed process material encompasses the cooler core material and insulates it from most of the extruder action shear. The high-lead helical groove is intercepted at its trailing edge with numerous circumferential extruder grooves, which start deep, proceed downstream circumferentially and discharge back into the leading edge of the high-lead helical groove, with their depth reduced to a minimum. This design develops pressure in the process material, abrading it against the barrel in a manner which warms the surface material and propels it downstream, at the surface of the groove effecting the fast-forward flow of the fluent phase material and thus exposing the cooler material to the extruder barrel.

With such a construction, the circumferential groove design thereby concentrates the fluent phase material at the circumferential straining and refining openings and minimizes rework of the fluent material. Extrusion pressure plus the circumferentially-produced pressure forces the fluent material into the openings formed by the outside diameter of the rotor and the barrel bore, while the restrictive opening prohibits the passage of oversize material. When altered for refining the process material, the beveled entrance tends to grind the agglomerates to size. The clearance being activated by the relative motion of the rotor to barrel, the usual blockage by oversize material does not occur, thus making the straining process continuous. The process material at the tooth top is intensively sheared as it passes from the tooth edge to the centrally located tooth top groove, and as all the process material traverses the route only once, uniform processing is achieved. The circumferential tooth top groove intercepts all of the process material, flowing from both tooth edges, and leads it to numerous ports, starting at the tooth top groove, extending radially inward to a bore at the core of the rotor.

As the process material is forced through the ports, material flow lines are developed in a radial direction and are in the position to be cross-sheared by the stationary screw-like member installed in the core of the rotor. Cross-shearing is recognized as one of the best mixing actions. The numerous ports connecting to the numerous tooth top grooves feeding into the screw-like member at the rotor core develops considerable macro-blending of the process material. The stationary screw-like member, actuated by the rotor member bore, extrudes the strained and refined material from the downstream end of the extruder. The stationary screw-like member extrudes the process material in a smooth stream, free from the usual "blips" caused by the rotating screw end flights. The diameters of the rotor bore and the screw-like member are tapered so as to permit adjustment to compensate for wear.

In the present invention, material rejected by the straining openings returns to the high-lead helical rotor groove and is directed downstream by filleted ends of the teeth forming the circumferential grooves. The oversize material, reaching the end of the straining and refining zone, is discharged from the extruder through separate ports, by a discharge metering device. This device can be set at a rate of discharge and pass the oversize material to atmosphere without loss of upstream extrusion pressure.

In the present invention, the combined arrangement of the rotor and barrel form a mixing labyrinth so efficient that complete processing is performed in a relatively short extruder length of six to seven diameters. Input work, for this length extruder, is approximately equal to the work required to heat the process material. Thus, the process material becomes the coolant, and the extruder is so called adiabatic, that is, no change of extrusion temperature is developed throughout the speed range of the extruder. This feature of the invention permits high-speed operation to make the extruder even more cost-effective.

As the strainer and refiner is adjustable as to capacity, more or less process material can be exposed to the same work and thereby extrude at different temperatures.

DESCRIPTION OF EXTRUSION APPARATUS

Referring now to the drawings, where like reference numerals and letters designate corresponding parts throughout several views of the apparatus, the extrusion apparatus is designated by the letter "A". The apparatus "A" in accordance with the invention is applied to the continuous straining and refining of hot or cold-fed rubber-like materials or thermoplastic materials, while extruding the desired product and has all the advantages as noted in the introduction. The extrusion apparatus "A" has a barrel 10 with a bore 11A and 11B extending therethrough and acts in conjunction with rotor 20, rotatably mounted therein and adapted for rotation by drive means 14.

The apparatus is provided with a hopper opening 16, through which the material to be processed is entered into apparatus "A". The rotor 20 is provided with an essentially helical extruder groove or grooves 21A and 21B which coact with barrel bore 11A and 11B to heat, pressurize and transport the process material in a downstream direction to the straining and refining zone 30. The helical rotor groove 21B of the straining and refining zone 30 is provided with a high-lead angle, which starts out at extruder capacity and progressively reduces in capacity to near zero at the downstream end of the zone.

The helical groove 21B is intercepted by numerous circumferential grooves 23 which are formed by circumferential teeth 24. The circumferential grooves 23 start deep at the trailing edge of the helical groove 21B, progressively diminish in depth around rotor 20 and return to the leading edge of the helical groove 21B. This arrangement leads off a portion of the process material to each circumferential groove 23, and relative rotation of the rotor 20 to barrel bore 11B develops pressure which added to the existing extrusion pressure drives the process material longitudinally over the tooth tops of teeth 24 to the circumferential tooth top groove 25. The clearance tooth top to the barrel bore is adjusted to pass only acceptable size material and is the straining opening of the straining zone. Process material not led off continues along circumferential groove 23 back to helical groove 21B which conveys it to the end of the straining and refining zone 30 to the last circumferential groove 23, where oversize material is collected and can transfer to barrel groove 33, which communicates with the overflow metering device 50 to 59. The end of rotor 20, at the end of the straining and refining zone 30 is blocked by a circumferential ridge 27 and arranged such that leakage over the ridge 27 is extruded back into the main stream by multiple rotor grooves 28.

Process material, passed over the top of circumferential teeth 24, enters the tooth top groove 25 from both directions, and all of the material is directed to radial ports which connect the circumferential tooth top groove 25, through the rotor 20, to rotor bore 36. Forcing material through the ports orients the material flow lines in a radial direction, where coming in contact with the stationary screw-like member 40 to 49 results in cross-shearing the flow lines of the process material, achieving valuable blending and dispersion. The stationary screw-like member reacts with rotor bore 36 to convey the process material to openings 44 in end plate 43. Thus, the extrusion is accomplished from a stationary screw, making an exceptionally uniform extrusion possible.

The rotor and barrel 30 of the straining and refining zone are tapered in diameter, with the large end downstream. This arrangement makes the mechanical adjustment of the straining openings possible, by means of the barrel shims 31 and 32 which shift the position of the barrel 30 in relation to the rotor 20. The rotor bore 36 and the stationary screw-like member 40 to 49 are also tapered in diameter, with the large end downstream. This feature fits the available space and is useful to compensate for wear.

The overflow metering device 50 to 59 communicates with barrel groove 33 and is arranged to allow the oversize process material to escape to atmosphere, at a preset rate without loss of upstream extrusion pressure.

Figure 2:
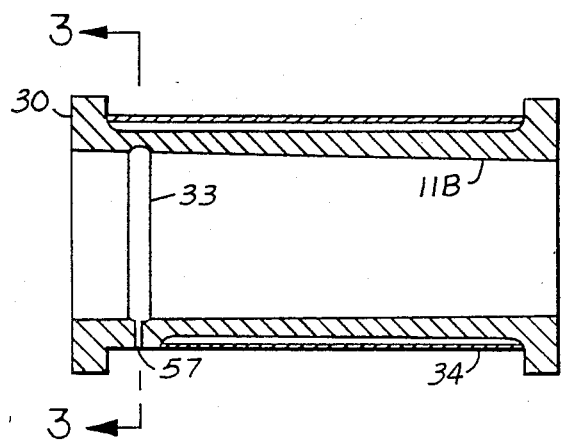
FIG. 2 is a sectional elevational view of the barrel of the straining and refining zone.
Figure 3:
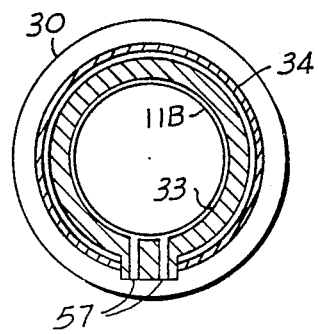
FIG. 3 is a sectional view taken on the line 3—3 of FIG. 2.
Figure 13:
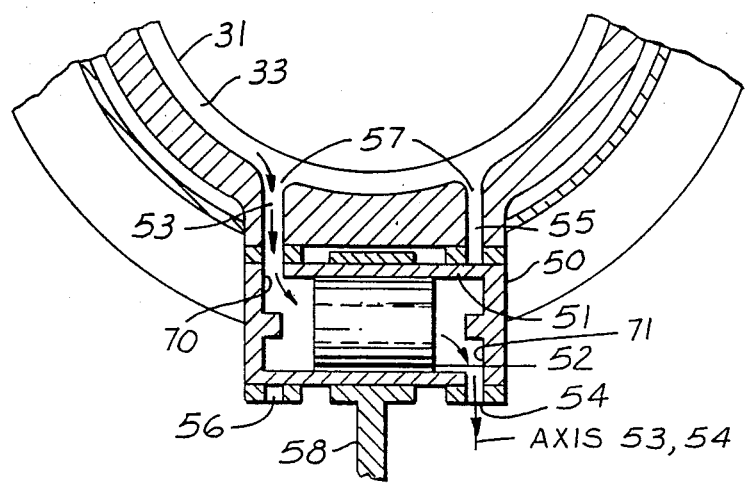
FIG. 13 is a sectional elevational view of the overflow metering device as mounted at the end of the straining zone.
Figure 14:
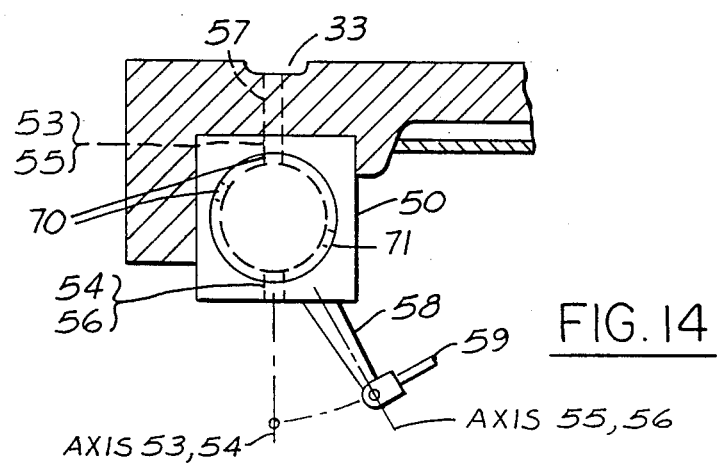
FIG. 14 is a side elevational view of FIG. 13 showing the drive means for the overflow metering device.

The straining and refining barrel 30 of FIG. 2 illustrates the barrel groove 33 and the outlet 57 leading to the overflow metering device 50 to 59 of FIGS. 13 and 14.

Figure 4:
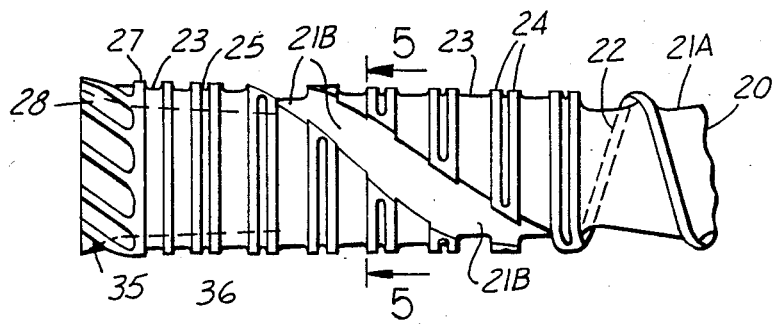
FIG. 4 is a fragmentary elevational view of the rotor of the straining and refining zone.

The rotor of FIG. 4 shows in detail the rotor groove configuration of the straining zone. The helical extrusion groove 21B is a high-lead continuation of 21A. It starts at extruder capacity and progressively decreases in capacity to the downstream end of the straining and refining zone. Communicating with the trailing edge of 21B are numerous circumferential extruder grooves 23, which start deep and progressively diminish in depth as they circle the rotor and return to the leading edge of helical groove 21B in a severly diminished capacity. The teeth 24, forming the circumferential grooves 23, are provided with a circumferential tooth top groove 25, centrally located in a manner that intercepts all of the process material flowing across the tooth top from both directions and directs the process material to communting holes 39, FIG. 10, which lead off the process material from tooth top groove 25 to the rotor bore 36.

Figure 5:
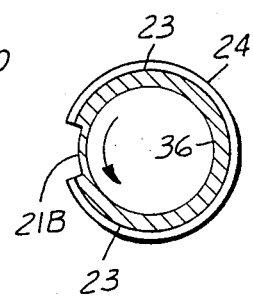
FIG. 5 is a cross-sectional view taken on the line 5—5 of FIG. 4.

FIG. 5 is a cross-sectional view of FIG. 4 showing the relation of helical groove 21B to circumferential groove 23 and illustrates rotor 20 and bore 36.

Figure 6:
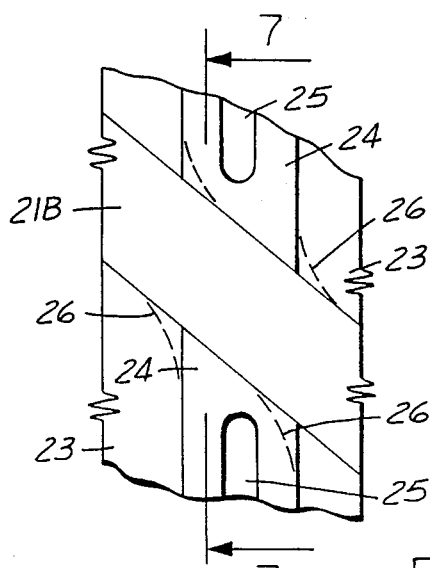
FIG. 6 is an enlarged fragmentary view of portions of FIG. 4 detailing the intersection of the helical and circumferential extruder grooves of the straining and refining zone.

FIG. 6 is an enlarged view of the intersection of helical groove 21B with grooves 23. The fillets 26 are a means of directing process material, entering 21B from grooves 23, downstream along helical groove 21B.

Figure 7:
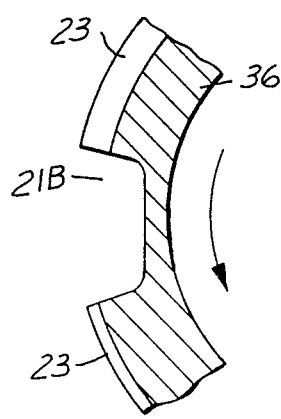
FIG. 7 is a cross-sectional view taken on the line 7—7 of FIG. 6.

FIG. 7 is a cross-sectional view of FIG. 6 and shows the difference in depth of the start of groove 23 to the discharge end of groove 23.

FIG. 8 is an isometrical view of the tooth top of tooth 24 showing sharp entrance edges 61 primarily used for straining the process material. Also one of many discharge ports 65 communicates between the circumferential tooth top groove 25 and the bore 36 of rotor 20.

FIG. 9 is an isometrical view of the tooth top of tooth 24 showing beveled entrance edges 62 primarily used for refining. Such construction may be used alone or with the sharp entrance edges 61 of FIG. 8.

FIG. 10 is an isometrical view of a typical port 65 as used in FIGS. 8 and 9. The port 65 is used to communicate between the tooth top groove 25 and rotor bore 36.

The stationary screw-like member 40 of FIG. 11 and FIG. 12 is installed in the bore of rotor 20. It is provided with a single-lead helical groove 41 and cooling passages 42, with inlet and outlet pipes 37 and 38, complete with mounting plate 43 and outlets 44. The screw-like member 40 is attached to mounting plate 43 by means of end cap 49. The outlets 44 and the cooling pipes 37 and 38, as installed on end plate 43, are shown in FIG. 12.

The Dross overflow metering device of FIGS. 13 and 14 illustrates the barrel accumulation groove 33 communicating with outlet ports 57 which lead to barrel entrance ports 53 and 55. The cylinder 50 is provided with a pair of entrance openings 70 and a pair of exit openings 71. When an entrance opening 70 to the metering cylinder 50 is aligned with barrel entrance port 53 or 55, oversize process material enters cylinder bore 51 and forces the free moving piston 52 to the remote position and thereby forcing a measured amount of previously entered process material from cylinder exit opening 71 via exit ports 54 and 56.

The cylinder 50 of the overflow metering device is rotatable in order to align the entrance holes 70, 71 of cylinder 50 alternately with an entrance port 53 or 55 so as to shuttle the free moving piston 52 back and forth and to thereby exit a measured amount of process material from discharge ports 54 and 56 at each index position. A lever arm 58 is connected to the metering cylinder 50 and is activated by the drive means 59. With such a construction, the bad material such as oversize wire, tramp metal, etc. is removed without the apparatus loosing pressure. The rate of flow can be set by adjusting the length of stroke or altering the index cycle.

The overflow metering device 50, as shown in FIG. 14, has two indexing positions, one on axis 53-54 and the other on axis 55-56.

Figure 15:
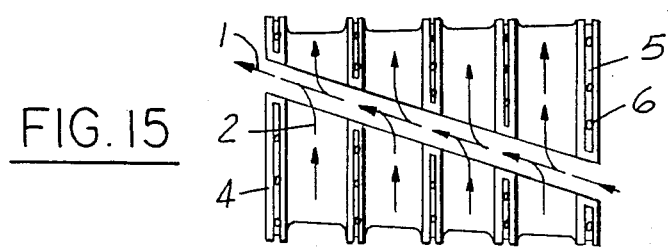
FIG. 15 is an elevational view of the straining and refining section of the apparatus.

The process steps and features of the straining and refining section of the apparatus are illustrated by numerals 1, 2 and 4-8 of FIG. 15 and are as follows:

1. Mainstream extrusion flow is longitudinal, and feeds open end circumferential grooves 2.
2. Partial extrusion circumferential flow, with restrictive flow outlet as also illustrated by groove 23 of FIG. 7.

4. Restrictive tooth top clearance length is approximately equal to two circumferences in length per flight.
5. Tooth top circumferential groove.
6. Tooth top radial ports.
7. Concentric rotor end bore with take-away screw.
8. Dross overflow device.

In conclusion, the apparatus as described herein is for the extrusion of thermoplastic and rubber-like materials and includes a feed means or hopper adapted for hot or cold feed of the selected material and an extruder screw-type forcing zone followed by a straining refining zone. The apparatus has a straining means adjustable to the acceptable particle size and can be arranged to refine agglomerates to the acceptable particle size.

The apparatus has numerous circumferential grooves which inherently develop the fast-forward flow of the fluent phase material and is arranged to place the developed fluent phase material at the entrances to the straining or refining openings. The apparatus has an adequate straining opening length to provide for full extrusion capacity with only a 0.002 inches wide opening, and intensively shears and leads off all of the process material, crossing the tooth top once only, thereby achieving uniformity of processing.

The apparatus has a rotor tooth top groove which intercepts all of the process material flowing through the clearance tooth top to barrel bore, from the circumferential grooves, upstream and downstream of the tooth, and has the circumferential tooth top groove communicating with a concentric bore of the rotor, through numerous ports which orient the led-off process material flow lines in a radial direction. The apparatus also has a stationary screw-like member in the concentric bore of the rotor, which cross-shears the process material flowing from the numerous ports and advances it toward the extruder discharge end. With such a construction, the concentric bore of the rotor is tapered to make the clearance adjustable. Also, the apparatus has the extruder discharge coming from a stationary screw-like rotor, thereby obtaining a smooth extrusion free from the "blip" caused by a rotating screw end. In addition, the apparatus has means for transporting the rejected oversize material to the end of the straining zone and includes a means at the end of the straining zone to accumulate the oversize material and exit it to atmosphere at a controlled rate, without loss of upstream extrusion pressure. The novel apparatus accomplishes all of the above in a short extruder with power input approximately equal to the heat required to warm the process material and has a power requirement less than most modern extruders. The apparatus has adjustable capacity control, which input power being essentially unchanged, adjusts the temperature of the extrusion. Fluid temperature control jackets are provided which adjust machine temperature to adjust the friction coefficient and material to machine surfaces. Finally, the apparatus has a design which is essentially adiabatic and thereby can be operated at high speed to achieve high extrusion capacities.

What I claim is:

1. An apparatus for straining, refining, separating and extruding thermoplastic and rubber-like process materials, both hot or cold feed, said apparatus having a cylindrical barrel provided with a bore and with extrusion ports, said apparatus also having a rotor with a concentric rotor bore rotatably mounted in the barrel bore and operable to move said process material from one end of said barrel bore to the other end to progressively heat, develop pressure, refine, strain and separate fine and fluent material from oversize and less fluent process material and to discharge the separated material from different extrusion ports, comprising:

first means, structurally integral with said rotor and barrel bore, having a helical extrusion groove for the development of heat, pressure and transportation of said process material;

second means, structurally integral with said rotor, having a high-lead helical extrusion groove connected to said helical extrusion groove of said first means starting at full extrusion capacity and progressively reducing in extrusion capacity toward the discharge end of the apparatus;

third means, structurally integral with said rotor, having circumferential teeth and circumferential extrusion grooves formed by said circumferential teeth, said circumferential extrusion grooves which start deep at the trailing edge of said high-lead helical extrusion groove of said second means, circle the rotor and discharge at a greatly reduced capacity at the leading edge of said high-lead helical extrusion groove, and said circumferential teeth having a clearance, tooth top to barrel bore, which is restrictive to oversize process material and thereby forms straining openings, which due to relative rotational movement do not become plugged with process material;

fourth means, structurally integral with said tooth tops, having a centrally located circumferential tooth top extrusion groove which continuously intercepts all process material as passed by said straining openings at both edges of said tooth top;

fifth means, structurally integral with said rotor, having ports extending in a radial direction from said tooth top extrusion groove to said concentric bore of said rotor, the combined area of said straining openings being adequate to continuously pass all of the now-strained and refined process material;

sixth means, structurally integral with said concentric rotor bore, having a stationary screw-like member provided with a helical extruder groove of adequate capacity to extrude the strained and refined process material from the end of the apparatus with adequate pressure to operate extrusion dies; and seventh means, structurally integral with the end of said barrel bore and an end of said high-lead helical rotor extrusion groove, having rotor and barrel circumferential grooves which collect and direct the oversize process material to ports leading to an overflow metering device which discharges said material from separate exit ports, without the loss of upstream extrusion pressure.

2. An apparatus for straining, refining, mixing and extruding thermoplastic and rubber-like process materials for both hot or cold feed which comprises:

an elongated cylindrical barrel member and an elongated cylindrical rotor member disposed axially in the interior of said barrel member;

means provided for relative rotational movement between said rotor and barrel members in the treating and axial advancing of the material to be processed;

said rotor and barrel members having a feed end, a discharge end with a forcing zone, a straining and refining zone, and a discharge pressurizing zone interposed between said feed and discharge ends;

said rotor of the forcing zone being provided with one or more longitudinal helical groove of a configuration adequate to pressurize and transport the selected process material to the straining and refining zone;

said straining and refining zone being provided with one or more helical grooves, being a continuation of said forcing zone helical grooves, but of a much higher lead than said forcing zone helical grooves, said high-lead grooves or groove starting at apparatus extrusion capacity and decreasing uniformly along the length of the straining and refining zone to minimum extrusion capacity at the downstream end of said straining and refining zone;

a plurality of a circumferential ridges of teeth on said rotor forming a plurality of circumferential extrusion grooves;

commuting with the trailing edge of said high-lead helical grooves are said circumferential extrusion grooves which start at maximum capacity, extend circumferentially around said rotor and back to the leading edge of said high-lead helical groove whereby said relative rotational movement between said rotor and barrel members causes the process materials to flow longitudinally along said high-lead helical grooves and axially into and along said circumferential extrusion grooves;

said circumferential ridges of teeth forming the circumferential extrusion grooves being provided with tooth top circumferential extrusion grooves centrally located and arranged to intercept essentially all extrusion flow or leakage between said circumferential tooth top and barrel bore from both the upstream and downstream edges of the tooth top;

the clearances between the tooth top to barrel bore defining straining openings and process material is accepted, refined to size or rejected at said straining openings according to size;

the accepted process material, crossing the tooth top reaches said circumferential tooth top grooves which lead the material to numerous ports, extending from the tooth top groove bottom radially inward to a concentric rotor bore of said discharge pressurizing zone, said concentric rotor bore housing a stationary screw-like member which is provided with a helical extruder groove or grooves which are operable due to reaction to the rotor bore to generate pressure and extrude process material out of said discharge end of the apparatus;

the oversize process material which is not led off through said straining openings being returned to the leading edge of said high-lead helical extruder groove from where it is transported to the downstream end of the strain and refining zone where a circumferential rotor groove coacts with a circumferential barrel groove which directs the material to discharge ports leading to an overflow metering device which is arranged to discharge the oversize process material to atmosphere without loss of upstream extrusion pressure.

* * * * *